United States Patent [19]
Whistler et al.

[11] Patent Number: 5,170,620
[45] Date of Patent: Dec. 15, 1992

[54] SUGAR FUELS FOR INTERNAL COMBUSTION ENGINES

[75] Inventors: Roy L. Whistler, West Lafayette, Ind.; Charles W. Baker, Germantown, Md.

[73] Assignee: Lafayette Applied Chemistry, Inc., West Lafayette, Ind.

[21] Appl. No.: 693,141

[22] Filed: Apr. 29, 1991

[51] Int. Cl.$^5$ .......................... F02C 3/20; F02G 1/00; F02B 75/12

[52] U.S. Cl. ............... 60/39.02; 60/39.461; 60/39.464; 123/1 A

[58] Field of Search ............... 60/39.461, 39.464, 736, 60/39.02; 44/313; 149/84; 123/1 A

[56] References Cited

U.S. PATENT DOCUMENTS

| | | | |
|---|---|---|---|
| H,227 | 3/1987 | Tracy et al. | 149/84 |
| H,231 | 3/1987 | Young | 149/84 |
| 3,256,688 | 6/1966 | Hill | 60/39.464 |
| 3,271,951 | 9/1966 | Nettel | 60/39.464 |
| 4,325,329 | 4/1982 | Taylor | 123/1 A |
| 4,364,337 | 12/1982 | McCann | 123/1 A |
| 4,423,332 | 12/1983 | Fengler | 60/39.464 |
| 4,425,136 | 1/1984 | Pearson et al. | 44/313 |
| 4,550,691 | 11/1985 | McWade | 123/1 A |
| 4,553,504 | 11/1985 | Duggal et al. | 123/1 A |
| 4,603,662 | 8/1986 | Norton et al. | 123/1 A |
| 4,877,591 | 10/1989 | Epperly et al. | 423/235 |
| 4,971,597 | 11/1990 | Gartner | 44/313 |
| 5,100,642 | 3/1992 | Baycura | 123/1 A |

FOREIGN PATENT DOCUMENTS 0214235 9/1987 Japan.
0124833 5/1988 Japan.

OTHER PUBLICATIONS

"How Brasil Grows Motor Fuel", V. Yang et al., *Chemtech*, Mar. 1981, pp. 168-172.

"Evaluation of Sugar-Based Syrups and Polymers as Fuels in Pyrotechnic Systems", Valdis A. Augstkalns & J. Miller, Edgewood Arsenal Technical Memorandum, Edgewood Arsenal, Maryland, May 1967.

"Hydroprocessing of Biomass Tars for Liquid Engine Fuels", Ed J. Soltes & S. Lin, Progress in Biomass Conversion, vol. 5, pp. 1-67, 1984 by Academic Press, Inc.

*Primary Examiner*—Richard A. Bertsch
*Assistant Examiner*—Howard R. Richman
*Attorney, Agent, or Firm*—Hoffmann & Baron

[57] ABSTRACT

An assembly for producing heat/mechanical energy by combustion of sugar includes a combustion chamber and a means for fluidizing sugar. Fluidized sugar is injected into the combustion chamber, optionally in combination with a hydrocarbon fuel and ignited. The combustion gas energy can be recovered as usable mechanical energy using conventional piston crank shaft or turbine asssemblies. Exhaust gases have reduced levels of noxious pollutants relative to exhaust gases from internal combustion engines not burning sugar fuels.

19 Claims, 3 Drawing Sheets

SUGAR FUELS FOR INTERNAL COMBUSTION ENGINES

FIELD OF THE INVENTION

This invention relates to the use of sugars as motor fuels. More particularly, this invention is directed to the combustion of sugars and sugar derivatives for powering turbines and other internal combustion engines.

BACKGROUND AND SUMMARY OF THE INVENTION

Because of high production costs and the environmental costs associated with recovery, transport, and burning of petroleum derived fuels, significant research and development efforts have been directed to replacement of petroleum derived fuels with fuels derived from biomass. The environmental advantages of the use renewable biomass-derived fuels have long been recognized. Not only does use of biomass-derived fuels reduce demand and reliance on non-renewable petroleum resources, but burning of biomass-derived fuels also releases far fewer noxious pollutants into the air.

The biomass product most widely used to fuel motor vehicles is ethanol, often mixed with gasoline to form "gasohol". Fuel ethanol has been produced commercially for many years by fermentation of cane sugar (sucrose) and of sugars obtained from hydrolysis of the starch and/or cellulose present in a wide variety of biomass feedstocks including, for example, grain, potatoes, cassava and wood pulp. However, the cost of fermentation/ethanol production facilities, coupled with costly energy intensive processes for concentrating ethanol from fermentation broths has diminished the attractiveness of ethanol as a motor fuel.

The present invention enhances the economic viability of substituting renewable resource biomass fuels for hydrocarbon fuels by providing for the direct combustion of biomass derived sugars in internal combustion engines. Thus, in accordance with the invention, an assembly is provided for producing mechanical energy by combustion of a sugar fuel. The assembly includes a combustion chamber and means for fluidizing the sugar fuel. Fluidization of the sugar fuel can be accomplished by melting to form a pumpable sugar melt or by combining the fuel with a fluid carrier. When a fluid carrier is used to fluidize the sugar fuel, the fluid carrier is preferably itself a combustible fluid. Fluidized sugar fuel and an oxidizing agent (generally air or oxygen) are injected either separately or in admixture into a combustion chamber, and the resulting combustible mixture is ignited in the combustion chamber. The heat energy of the combustion gases can be transferred to a working fluid, such as water or steam, via a heat exchanger, or it is recovered as mechanical energy by conventional piston/crankshaft, or turbine assemblies.

DETAILED DESCRIPTION OF THE INVENTION

Figure 1:
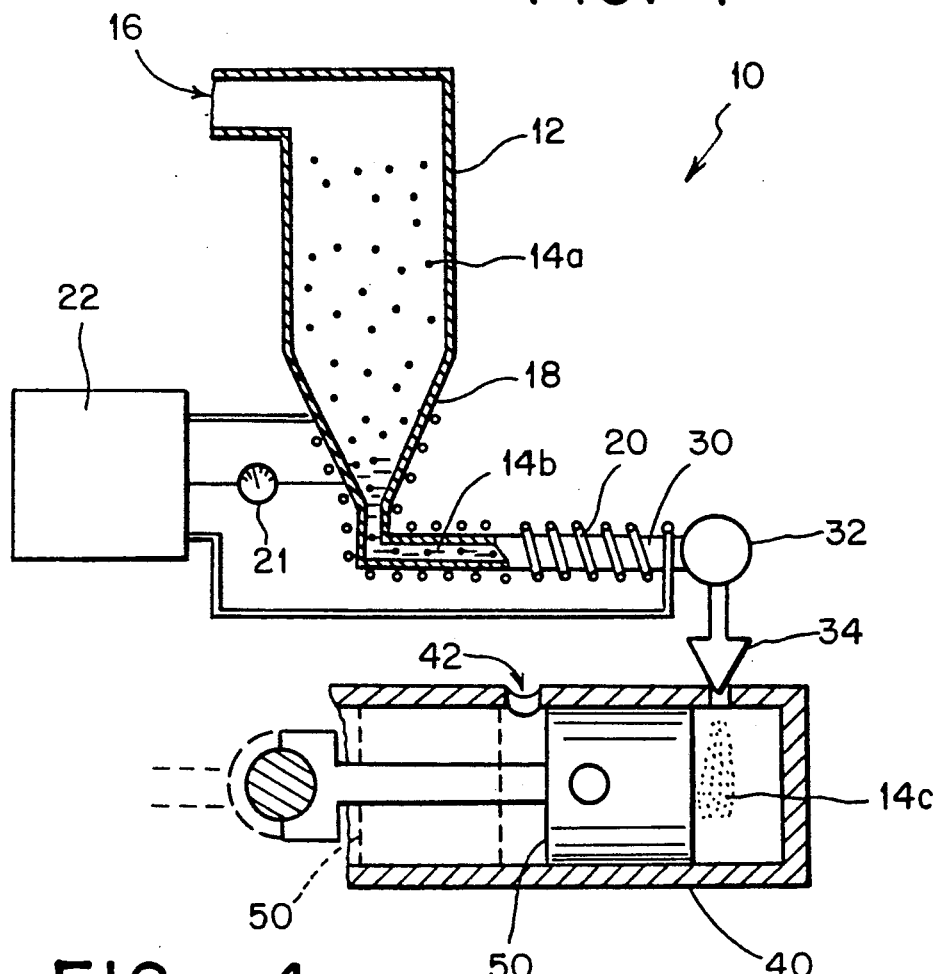
FIG. 1 diagrammatically illustrates a sucrose burning engine assembly.

Sugar fuels suitable for use in accordance with the present invention include monosaccharides such as D-glucose (dextrose) and fructose, disaccharides such as sucrose and maltose and sugar derivatives, such as sugar alcohols, for example, sorbitol, and sugar ethers; and for the purpose of defining the present invention "sugar" is intended to embrace all such compositions. Sucrose is preferred because of its low cost relative to other sugars. Sucrose is one of the most abundant pure chemicals in commerce and can be easily transported in granular form and stored without needing special precautions against ignition or leakage. Complete combustion of sucrose produces carbon dioxide, water, and 1342.2 kilocalories per mole.

An important aspect of this invention is fluidization of the sugar fuels to enable their delivery to a combustion chamber in a form suitable for efficient combustion. Fluidization of the sugar is achieved most simply by melting the sugar to form a sugar melt. Alternatively sugar fluidization for the present invention can be attained by forming a dispersion or solution of the sugar in a fluid carrier for high pressure injection into a combustion chamber. The fluid can be a gas or liquid, preferably one that can itself complement or supplement sugar combustions. Most preferably the fluid is itself combustible. Where the fluid is a combustible liquid and fluidization of the sugar is to be achieved by forming a sugar solution, sugar solubility can be enhanced by the use of surfactant additives. For example, surfactant modified petroleum distillate is useful.

Fluidized sugar is injected into a combustion chamber to form a combustible dispersion comprising a sugar and an oxidizing agent, typically air (oxygen). Thus, for example, melted sucrose can be pumped at high pressure through an injector or spray nozzle in to the combustion chamber to form a combustible sucrose mist. Alternatively, melted sugar can be pumped under pressure to an air blast atomizer of the general type used in industrial furnaces and gas turbines. Compressed air is used to produce high velocity differences between air and liquid (sugar) flows. The resulting aerodynamic interaction produces high shear and resultant disintegration of the liquid stream into shreds that quickly form minute droplets under the force of surface tension. The atomized droplets have high surface to volume ratio to promote rapid burning. Secondary air is typically provided in the combustion chamber to assure complete combustion of the atomized sugar.

Optionally, a hydrocarbon fuel or hydrogen gas can be burned in combination with a sugar fuel in accordance with this invention by being separately but simultaneously injected into the combustion chamber with the fluidized sugar fuel. The hydrocarbon fuel can be a petroleum distillate such as diesel or gasoline, natural gas, or even biomass derived alcohols or methane.

The heat energy produced by sugar combustion in accordance with this invention can be recovered, for example, by heat exchanger in thermal communication with combustion gases or it can be converted to mechanical energy. Energy converting means includes a piston positioned for reciprocating movement in the combustion chamber, such as is commonly associated with internal combustion engines. Alternatively, combustion gases produced by the burning the sugar fuel can be utilized to drive a turbine.

Ignition of a fuel/air mixture in the combustion chamber is accomplished either by direct ignition with an electric spark or by spontaneous ignition upon injection into superheated (generally greater than 700 degrees Celsius) compressed air in the combustion chamber.

Additional objects, features and advantages of the invention will be apparent to those skilled in the art upon consideration of the following detailed description of preferred embodiments.

With reference to FIG. 1, an engine assembly 10 is provided for the production of useful mechanical energy from combustion of sucrose in a combustion chamber 40. A hopper 12 contains granular sucrose 14a to fuel the engine assembly 10. Granular sucrose 14a is introduced into the hopper 12 through inlet 16. The lower portion 18 of the hopper 12 is in fluid communication with fuel conduit 30, pump 32 and injector 34, and all are positioned in thermal communication with a heating coil 20. The heating coil 20 is energized by an energy supply 22 under regulation of a thermostat 21 to maintain the temperature in both the lower portion 18 of the hopper 12 and the fuel conduit 30 at a temperature sufficient to melt granular sucrose 14a and to maintain it as a sucrose melt 14b.

Heating coil 30 contains a working fluid (not shown) for transferring heat energy from energy supply 22 to the lower portion 18 of hopper 12, conduit 30, pump 32 and injector 34. Energy supply 22 provides electrical resistance heating for the working fluid in coil 20 and further it includes means for thermally coupling exhaust gases from engine assembly 10 with said working fluid. Alternatively heating coil 20 can be supplemented with a parallel electrical resistance heating coil (not shown), or heating coil 20 can itself be an electrical resistance heating coil.

Sucrose melt 14b is transferred from the conduit 30 by a pump 32 into an injector 34. As the sucrose melt 14b is pumped through injector 34 into the combustion chamber 40, the sucrose melt 14b is atomized to produce a sucrose mist 14c. Sucrose mist 14c spontaneously combusts at high temperatures created under compression by piston 50, and piston 50 is driven outward from the combustion chamber 40 by the heated, expanding combustion gases.

Operation of the engine assembly 10 corresponds to operation of conventional diesel engines. With piston 50 in the position shown by the dotted line, air is introduced into the combustion chamber through a port 42. As the piston 50 moves into the combustion chamber 40, air is compressed and consequently heated to a temperature of greater than 700 degrees Celsius. Sucrose melt 14b is then pumped through injector 34 and injected as sucrose mist 14c into the heated air in combustion chamber 40. Because of the high compression-induced air temperature in the combustion chamber 40, the sucrose mist 14c spontaneously ignites. The expanding combustion gases produced upon ignition of the sucrose 14c drive the piston 50 outward from the combustion chamber 40 an exit same as exhaust gases through port 42.

Figure 2:
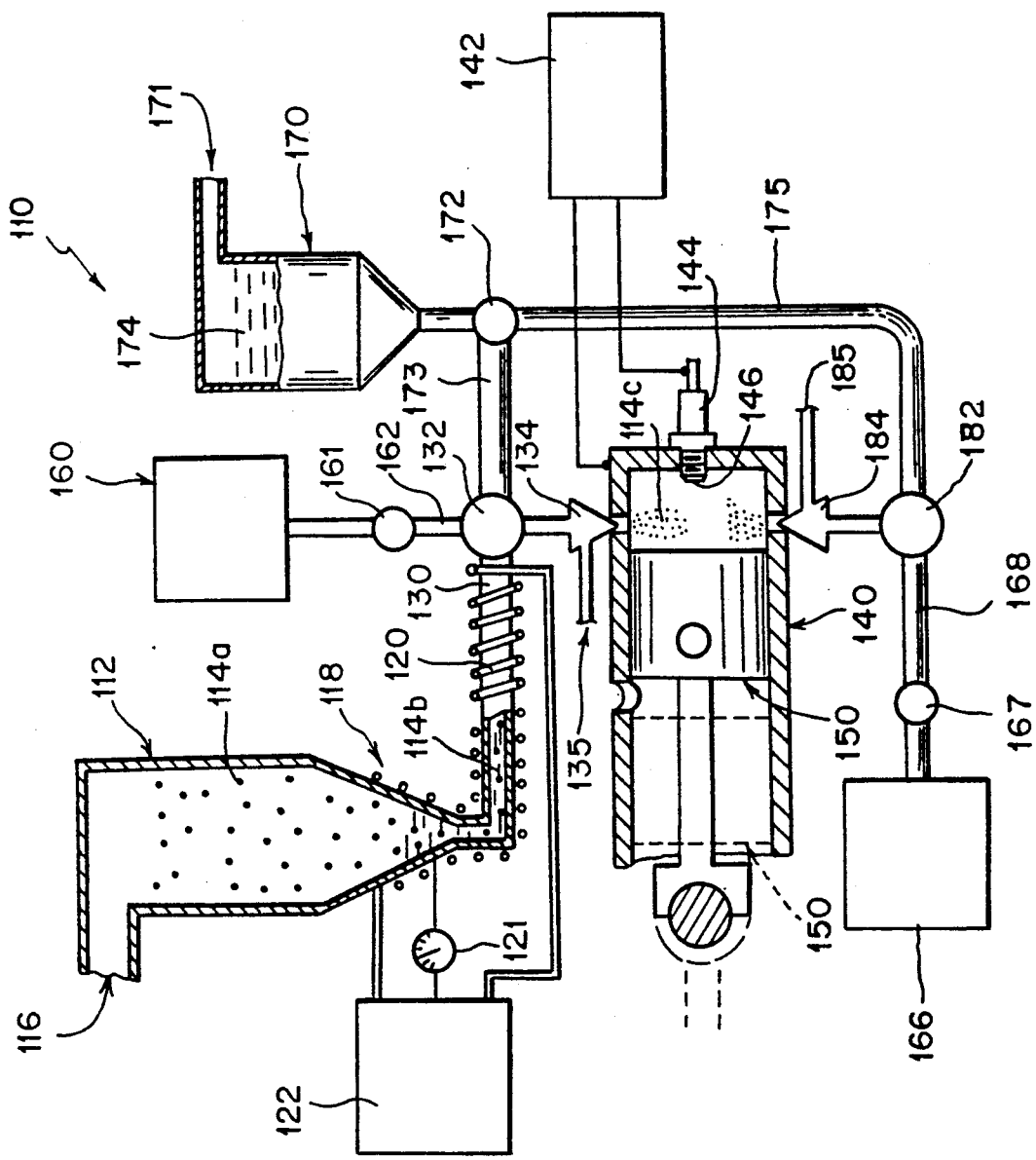
FIG. 2 diagrammatically illustrates an engine assembly for burning sucrose alone, or in combination with other fuels.

FIG. 2 illustrates an engine assembly 110 optionally fueled by sucrose alone, by sucrose in combination with a biomass fuel (such as alcohol) or petroleum derived fuel, or by sucrose in combination with methane or hydrogen gas. A hopper 112 having a lower portion 118 contains granular sucrose 114a to fuel the engine assembly 110. Granular sucrose 114a is introduced into the hopper 112 through inlet 116. The lower portion 118 of the hopper 112, as well as fuel conduit 130, pump 132 and injector 134 in fluid communication therewith, is positioned in thermal contact with a heating coil 120 that provides heat for melting the granular sucrose 114a to form sucrose melt 114b. The heating coil 120 is energized by energy supply 122 under regulation of thermostat 121 to provide heat for melting the granular sucrose 14a and maintaining the sucrose melt 114b at a temperature between about 185° and 250° C. Configuration/operation of energy supply 122 and heating coil 120 is identical to that described above for the corresponding elements (energy supply 22 and heating coil 20) in assembly 10 of FIG. 1. Sucrose melt 114b is transferred from conduit 130 by pump 132 into injector 134 for atomization and intimate mixture with air introduced into injector 134 through the air inlet 135. The resulting sucrose mist 114c is injected into the combustion chamber 140 and ignited by an electrical spark 146 generated at spark plug 144 by a power supply 142. A piston 150 is reciprocably driven in the combustion chamber 140 by the energy released upon combustion of the sucrose mist 114c.

Heat energy produced by combustion of the sucrose mist 114c can be augmented by combustion of a flammable gas (not shown) such as methane or hydrogen. The flammable gas is introduced into the combustion chamber 140 by opening valve 161 to allow passage of the flammable gas from a gas supply 160 through a conduit 162 and into pump 132, where the flammable gas is injected with sucrose melt 114b through injector 134 and into combustion chamber 148. Alternatively, valve 161 is closed, and a valve 167 is opened. Flammable gas in gas storage tank 166 flows through a conduit 168 and to a pump 182. Pump 182 forces the flammable gas (not shown) through injector 184, where it is mixed with air and injected crosscurrent to sucrose mist 114c also being injected into combustion chamber 140.

Flammable liquid fuels such as gasoline, kerosene, ethanol, methanol, or other petroleum or biomass derived liquid fuels can also be burned in combination with sucrose to provide useful mechanical energy. For example, a liquid fuel 174 introduced through an inlet 171 into a tank 170 can be used as an auxiliary fuel for the engine assembly 110. Valve 172 is opened to allow flow of liquid fuel 174 into conduit 173. Liquid fuel 174 is mixed with sucrose melt 114b in pump 132, and pumped to injector 134. The mixture of sucrose melt 114b and liquid fuel 174 is mixed with air introduced into injector 132 via air inlet 135, and the resulting mixture is injected into combustion chamber 140. In an alternative embodiment, liquid fuel 174 can be injected crosscurrent to sucrose mist 114c by opening valve 172 to a position in fluid communication with conduit 175. Liquid fuel 174 is pumped by pump 182 to injector 184, where it is injected with air into combustion chamber 140.

Engine assembly 110 allows selection of combination of fuels to be burned (sucrose alone, sucrose in combination with a flammable liquid, sucrose in combination with a flammable gas, injection of the flammable gas or liquid either with or crosscurrent to the sucrose, by opening (or closing) the selected valves 161, 172, or 167.

Piston 150 reciprocates in combustion chamber 140 between a position shown by the dotted line and the position shown in bold lines. Sucrose melt 114b is injected through injector 134 into combustion chamber 140, and the resulting combustible mixture of sucrose mist 114c and air is ignited by the electric spark 146. The expanding combustion gases produced by combustion of sucrose mist 114c (and optionally other fuels) drives piston 150 outward from combustion chamber 140 producing useful mechanical energy. Some fraction of the energy released by combustion drives piston 150 back into combustion chamber 140 to repeat the operation cycle.

Figure 3:
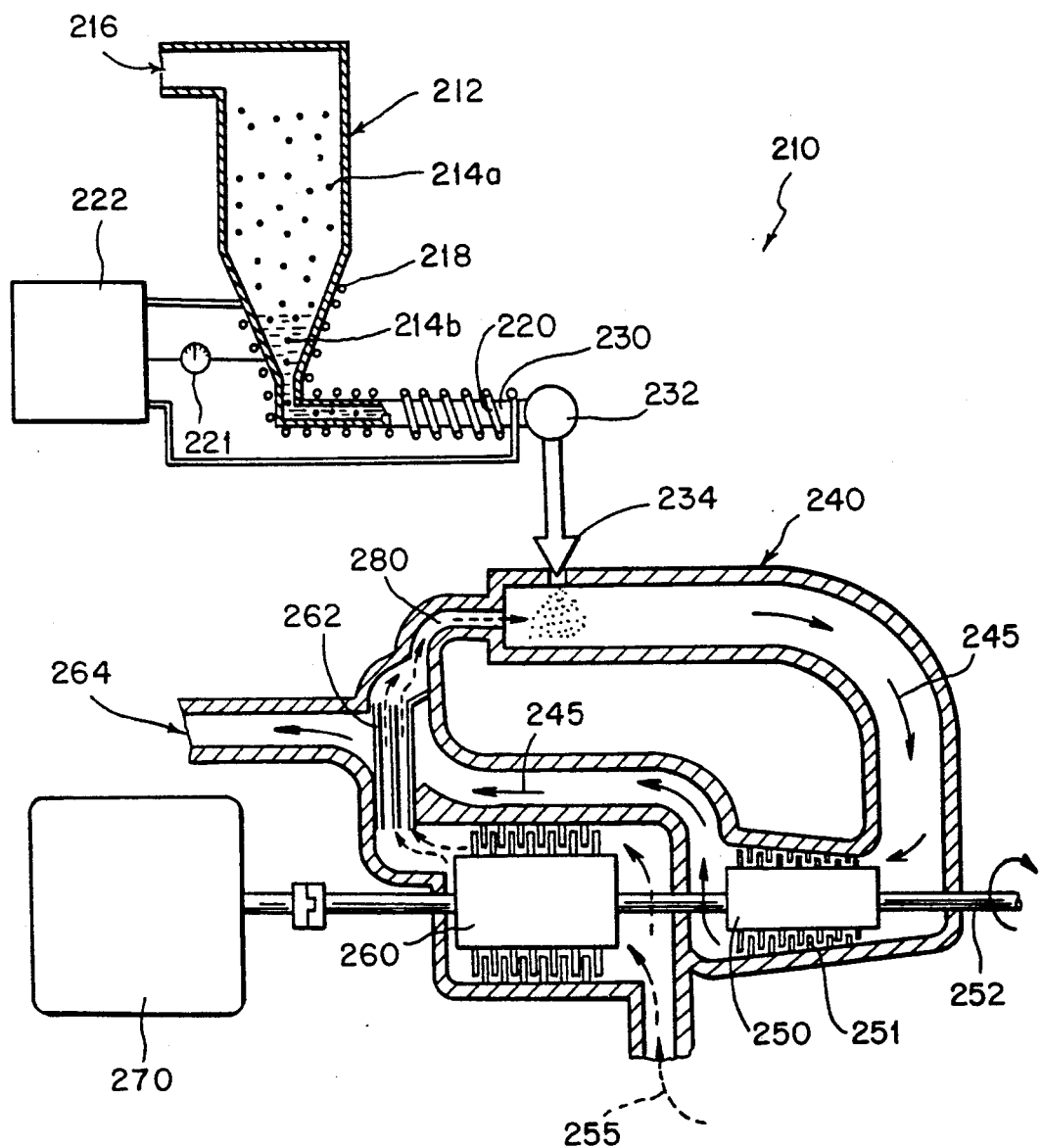
FIG. 3 diagrammatically illustrates a sugar-fueled gas turbine.

Sucrose is used to fuel a gas turbine 210 illustrated in FIG. 3. A hopper 212 having a lower portion 218 contains granular sucrose 214a to fuel the gas turbine 210. Granular sucrose 214a is introduced into the hopper 212 through inlet 216. The lower portion 218 of the hopper 212 and conduit 230, pump 232 and injector 234 in fluid communication therewith, are positioned in thermal communication with a heating coil 220. The heating coil 220 is energized by energy supply 222 under regulation of thermostat 221 to melt granular sucrose 214a and to maintain sucrose melt 214b at a temperature of about 185° to about 250° C. Sucrose melt 214b is forced by pump 232 through injector 234 and atomized to form sucrose mist 214c as it is injected into combustion chamber 240. Combustion gases 245 produced upon combustion of sucrose mist 214c expand and flow through combustion chamber 240 following the path indicated by the solid arrows. A turbine rod 252 operably coupled to a turbine 250 is caused to rotate as the expanding combustion gases 245 pass through vanes 251 of a turbine 250. The rotation of the turbine rod drives a compressor 260. The compressor 260 pressurizes the fresh air 255 and directs the pressurized air through heat exchange pipes 262 that cross the flow path of the heated combustion gases 245. Heat exchange between the compressed air and the combustion gases 245 cools the combustion gases (which are exhausted through exhaust outlet 264) and heats the compressed air prior to its delivery by air injector 280 into the combustion chamber 240. The turbine 210 is started by a starter engine 270.

Figure 4:
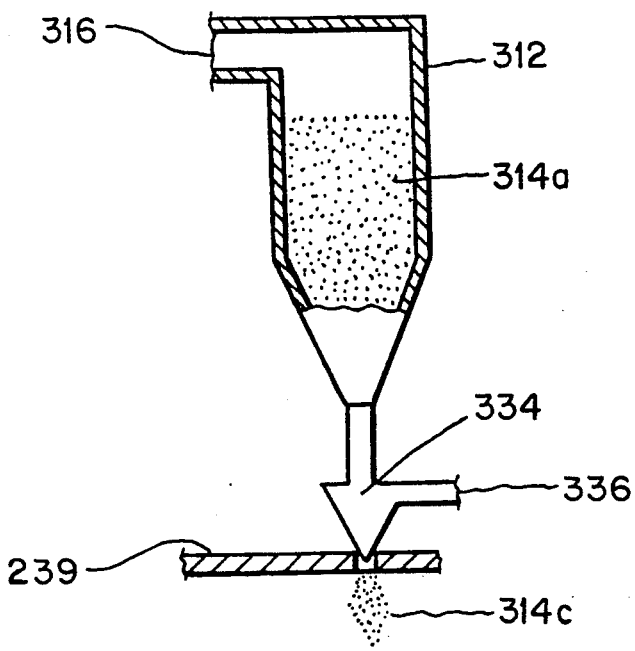
FIG. 4 diagrammatically illustrates a sugar fluidization component for use in accordance with the present invention.

Similar to the engine illustrated in FIGS. 1 and 2, the sugar fuel for gas turbine 210 can be supplemented with petroleum fuels or other biomass fuels. The supplemental fuels can be injected separately into the combustion chamber or they can be used to fluidize the sugar fuel, either as a particulate dispersion or as a sugar solution for injection into the combustion chamber. FIG. 4 illustrates a simplified sugar fluidization component for use in the present invention. Powdered sucrose 314a is delivered to hopper 312 through inlet 316. Powdered sucrose 314a flows under the force of gravity and is metered into injector 334 where it is fluidized as a dispersion or solution under the influence of a pressurized fluid fuel introduced through injector inlet 336. The resulting combustible dispersion/solution is delivered into a combustion chamber (not shown) through combustion chamber wall 239.

Although the invention has been described in detail with reference to preferred embodiments and specific examples, variations and modifications exist within the scope and spirit of the invention as defined in the following claims.

We claim:

1. A sugar-burning engine assembly comprising a combustion chamber,
    means for injecting an oxidizing agent into the chamber,
    means for injecting sucrose into the chamber to form a dispersion,
    means for igniting the dispersion in the chamber to produce combustion gases, and
    means for converting combustion gas energy into mechanical energy.

2. The assembly of claim 1 further comprising means for melting sucrose to provide a sucrose melt.

3. The assembly of claim 2 further comprising temperature control means for maintaining the sucrose melt at a temperature between about 185° C. and 250° C.

4. The assembly of claim 3 wherein the converting means comprises a turbine in gasflow communication with the combustion gases.

5. The assembly of claim 1 further comprising means for injecting hydrocarbon fuel into the combustion chamber.

6. An assembly for producing heat energy by combustion of sugar, the assembly comprising
    a combustion chamber,
    means for melting the sugar to form a sugar melt,
    means for injecting the sugar melt into the combustion chamber to form a combustible sugar mist,
    means for igniting the sugar mist, and
    means for recovering heat energy produced by sugar combustion.

7. The assembly of claim 6 wherein the sugar is sucrose.

8. A method for producing mechanical energy from combustion of sugar, the method comprising the steps of
    fluidizing a sugar,
    injecting the fluidized sugar into a combustion chamber with an oxidizing agent to form a dispersion,
    igniting the dispersion in the chamber, and converting the resultant heat energy into mechanical energy.

9. An assembly for producing mechanical energy by combustion of sugar, the assembly comprising
    a combustion chamber,
    means for fluidizing a sugar fuel,
    means for injecting the fluidized sugar fuel into the combustion chamber to form a combustible dispersion comprising a sugar,
    means for igniting the combustible dispersion in the combustion chamber, and
    means for converting into mechanical energy the heat energy of combustion gases produced by combustion of the sugar fuel in the combustion chamber.

10. The assembly of claim 9 wherein the fluidizing means comprises means for melting the sugar.

11. The assembly of claim 10 wherein the sugar is sucrose.

12. The assembly of claim 11 further comprising temperature control means for maintaining the melted sucrose at a temperature between about 185° C. and about 250° C.

13. The assembly of claim 1 wherein the heat energy converting means comprises a piston positioned for reciprocating movement in the combustion chamber.

14. The assembly of claim 13 wherein the ignition means comprises means for creating an electric spark in the combustion chamber.

15. The assembly of claim 13 wherein the ignition means comprises means for compressing air in the combustion chamber to provide an air temperature greater than 700° C.

16. The assembly of claim 9 wherein the converting means comprises a turbine in gas flow communication with the combustion chamber.

17. The assembly of claim 9 further comprising means for injecting hydrocarbon fuel into the chamber.

18. The assembly of claim 9 wherein the fluidizing means comprises means for mixing the sugar with a fuel selected from the group consisting of a hydrocarbon fuel and an alcohol fuel.

19. The assembly of claim 18 wherein the fuel is a surfactant modified petroleum distillate.

* * * * *